United States Patent
Chen (10) Patent No.: US 8,805,180 B2
(45) Date of Patent: Aug. 12, 2014

(54) SERVICE PROTECTION METHOD AND DEVICE BASED ON AUTOMATIC SWITCHED OPTICAL NETWORK

(75) Inventor: Hao Chen, Shenzhen (CN)

(73) Assignee: ZTE Corporation, Shenzhen, Guangdon Province (CN)

( * ) Notice: Subject to any disclaimer, the term of this patent is extended or adjusted under 35 U.S.C. 154(b) by 106 days.

(21) Appl. No.: 13/378,897

(22) PCT Filed: Jun. 11, 2010

(86) PCT No.: PCT/CN2010/073789
§ 371 (c)(1),
(2), (4) Date: Dec. 16, 2011

(87) PCT Pub. No.: WO2010/145497
PCT Pub. Date: Dec. 23, 2010

(65) Prior Publication Data
US 2012/0087650 A1    Apr. 12, 2012

(30) Foreign Application Priority Data
Jun. 17, 2009  (CN) .......................... 2009 1 0150832

(51) Int. Cl.
*G02F 1/00*       (2006.01)

(52) U.S. Cl.
USPC ........ 398/1; 398/2; 398/5; 370/216; 370/218; 370/351

(58) Field of Classification Search
None
See application file for complete search history.

(56) References Cited

U.S. PATENT DOCUMENTS

| | | | |
|---|---|---|---|
| 2002/0004843 A1* | 1/2002 | Andersson et al. | 709/238 |
| 2004/0022279 A1* | 2/2004 | Kailbach et al. | 370/542 |
| 2004/0120705 A1* | 6/2004 | Friskney et al. | 398/5 |
| 2004/0252635 A1 | 12/2004 | Kasper | |

FOREIGN PATENT DOCUMENTS

| | | | |
|---|---|---|---|
| CN | 101043267 A | 9/2007 | |
| CN | 101222364 A | 7/2008 | |
| CN | 101616344 A | 12/2009 | |
| WO | WO2007/128176 | * 11/2007 | H04L 12/24 |

* cited by examiner

*Primary Examiner* — Ken Vanderpuye
*Assistant Examiner* — Merlin Brito Peguero
(74) *Attorney, Agent, or Firm* — McGarry Bair PC (57) ABSTRACT

The present invention discloses a service protection method and device based on an automatic switched optical network (ASON), which are adapted to restoring a service when a fault occurs in the connection of the service. The method comprises: comparing a dynamic restoration lag time of the service with a protection switching lag time of the service; and starting a protection switching process to restore the service if the dynamic restoration lag time is greater than the protection switching lag time; and starting a dynamic re-routing process to restore the service if the protection switching lag time is greater than the dynamic restoration lag time. By the present invention, the reliability of the network is enhanced and the self-healing capacity of the ASON is improved.

14 Claims, 4 Drawing Sheets

SERVICE PROTECTION METHOD AND DEVICE BASED ON AUTOMATIC SWITCHED OPTICAL NETWORK

CROSS-REFERENCE TO RELATED APPLICATIONS

This application is a National Phase application of International Application No. PCT/CN2010/073789, filed Jun. 11, 2010, which claims the benefit of Chinese Patent Application No. 200910150832.0, filed Jun. 17, 2009, both of which are incorporated herein by reference in their entirety.

TECHNICAL FIELD OF THE INVENTION

The invention relates to the field of communications, in particular to a service protection method and device based on an automatic switched optical network (ASON).

BACKGROUND OF THE INVENTION

The ASON is an optical transport network which completes automatic switching and connection control by a control plane. The architecture of the ASON is divided into three planes: transport plane, control plane and management plane.

As an operating network for providing various services for users, the ASON must have very high reliability, i.e., having strong self-healing and restoration capability. Once there is a fault point, the network will be able to fast adopt other routes or protection modes to ensure that the services running thereon are not influenced or less influenced. Dynamic re-routing restoration is the highlight of the ASON; and services can be restored by the mode of fast re-routing in case of a network fault.

At the same time, different from the traditional optical network, the ASON has a new control plane which can implement the protection switching function of a protection group. The service protection methods for the protection group in the ASON in the related art include: 1. services are protected by a protection group at a ratio of 1:1, wherein such method has certain defects: wasting network resources; and 2. services are protected by the protection group at a ratio of M:N, wherein such method also has certain defects: when M protection connections are all occupied, the M+1th work connection cannot be protected if a fault occurs.

It is an inevitable trend to combine the protection switching mode in the protection group with the dynamic re-routing mode for the services to protect the services in the future. However, new problems will also be caused, i.e., the matching, priority, mutual exclusion and other problems between the two modes. For example, when one work connection in the protection group generates a fault, if the protection switching processing is started at first and the restoration is not performed until the failure of the switching, the precious protection connections will be occupied too early and the protection group will become useless; and if the restoration is started at first and the protection switching process is not started until the failure of the restoration, the network resources will be wasted to a certain extent.

For the matching, priority and mutual exclusion problems between the protection switching mode and the dynamic re-routing mode which are combined to protect services in related technologies, there is still no effective solution.

SUMMARY OF THE INVENTION

For the matching, priority and mutual exclusion problems between the protection switching mode and the dynamic re-routing mode which are combined to protect services in the related arts, a service protection method and device based on an ASON are provided. Therefore, the main objective of the present invention is to provide an improved service protection solution in order to solve the problems.

A service protection method based on an ASON is provided according to one aspect of the present invention.

The service protection method based on an ASON according to the present invention, used for restoring a service when a fault occurs in the connection of the service, comprises: comparing a dynamic restoration lag time of the service with a protection switching lag time of the service; and starting a protection switching process to restore the service if the dynamic restoration lag time is greater than the protection switching lag time; and starting a dynamic re-routing process to restore the service if the protection switching lag time is greater than the dynamic restoration lag time.

Preferably, the step of starting the dynamic re-routing process to restore the service comprises: re-selecting a route and setting up a new connection for restoring the service; switching the service to the new connection if the set-up of the new connection is successful; and starting the protection switching process to restore the service if the set-up of the new connection is failed.

Preferably, after the service is switched to the new connection, the method also comprises: switching the service to the connection, if the fault of the connection is eliminated.

Preferably, the step of starting the dynamic re-routing process to restore the service also comprises: starting a dynamic re-routing lag timer before the re-selection of the router, and re-selecting the route after the expiration of the dynamic re-routing lag timer.

Preferably, the step of starting the protection switching process to restore the service comprises: selecting an idle protection connection from protection connections and switching the service on the connection to the idle protection connection.

Preferably, the method also comprises: starting the dynamic re-routing process to restore the service if switching the service to the idle protection connection is failed or all the protection connections are occupied.

Preferably, after the service on the connection is switched to the idle protection connection, the method also comprises: switching the services to the connection if the fault of the connection is eliminated.

Preferably, the step of starting the protection switching process to restore the service also comprises: starting a protection switching lag timer before an idle protection connection is selected from the protection connections, and selecting an idle protection connection from the protection connections after the expiration of the protection switching lag timer.

Preferably, the method also comprises: stopping the protection switching process before the dynamic re-routing process is started to restore the service; or stopping the dynamic re-routing process before the protection switching process is started to restore the service.

A service protection device based on an ASON is provided according to another aspect of the present invention.

The service protection device based on an ASON according to the present invention, used for restoring a service when a fault occurs in the connection of the service, comprises: a comparing module adapted to compare whether a dynamic restoration lag time of the service is greater than a protection switching lag time of the service; a first starting module adapted to start the protection switching process to restore the service if the dynamic restoration lag time is greater than the protection switching lag time; and a second starting module adapted to start the dynamic re-routing process to restore the service if the protection switching lag time is greater than the dynamic restoration lag time.

By the present invention, whether the protection switching mode or the dynamic re-routing mode is selected to restore the services is determined by judging whether the dynamic restoration lag time is greater than the protection switching lag time, so that the matching, priority, mutual exclusion problems between the two modes are solved. The protection switching mode and the dynamic re-routing mode are combined and matched with each other to enhance the reliability of the network, and improve the self-healing capacity of the ASON.

BRIEF DESCRIPTION OF THE DRAWINGS

The drawings herein are adapted to the further understanding of the present invention and form one part of the application, and the schematic embodiments of the present invention and description thereof are adapted to the explanation of the present invention and not limiting the present invention. In the drawings.

DETAILED DESCRIPTION OF THE EMBODIMENTS

For the matching, priority and mutual exclusion problems between the protection switching mode and the dynamic re-routing mode which are combined to protect the services, the embodiments of the present invention provide a service protection solution based on an ASON, which combines the protection switching mode of a protection group with the dynamic re-routing restoration mode of services. The processing principle of the solution is as follows: judging whether the dynamic restoration lag time of the services is greater than a protection switching lag time of the services, and if so, starting the protection switching process to restore the services; otherwise, starting the dynamic re-routing process to restore the services.

It should be noted that, if not conflicted, the embodiments and features thereof in the application can be combined with one another. The present invention will be explained below with reference to the drawings and in conjunction with the embodiments in detail.

It should be noted that the steps shown in the flowchart of the drawings can be executed in a computer system with a group of computer executable instructions. In addition, although the logic order is shown in the flowchart, under some circumstances, the steps shown or described here can be executed in a different order.

Figure 1:
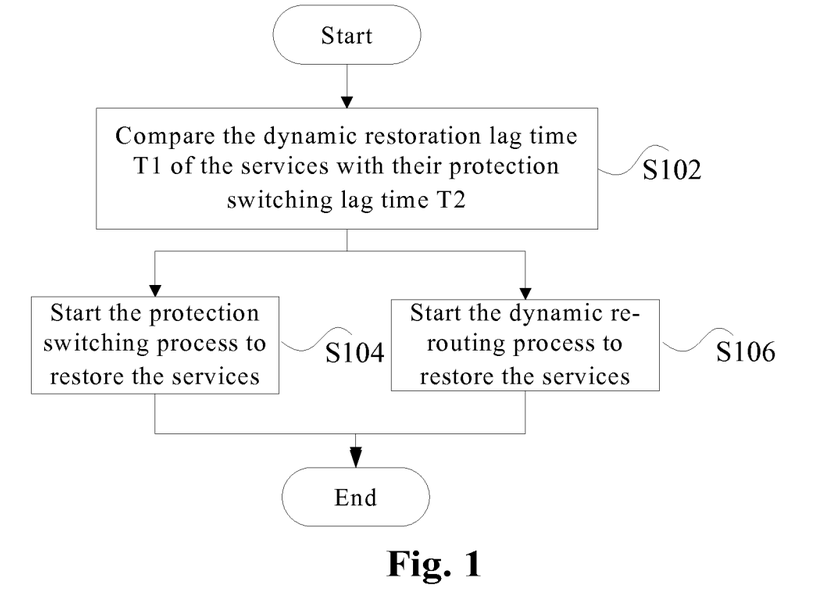
FIG. 1 is a flowchart of a service protection method according to the embodiments of the present invention.

According to the embodiments of the present invention, a service protection method based on an ASON is provided, which is adapted to restoring services when a fault occurs in the connection of the services. FIG. 1 is a flowchart of a service protection method according to the embodiments of the present invention, and as shown in FIG. 1, the method comprises steps S102 to S106.

It should be noted that this embodiment takes the example of the protection group of a ratio of M:N, which means that there are M protection connections and N work connections in the group.

S102: Compare the dynamic restoration lag time T1 of the services with their protection switching lag time T2. That is to say, when a fault in a work connection is detected, first, compare the dynamic restoration lag time T1 of the services of the connection with their protection switching lag time T2.

S104: If the dynamic restoration lag time is greater than the protection switching lag time, (i.e., T1>T2), start the protection switching process to restore the services; otherwise, (i.e., T1<T2), execute S106. It should be noted that if T1=T2, either the protection switching process or the dynamic re-routing process can be selected to restore the services as needed.

S106: Start the dynamic re-routing process to restore the services.

In the related arts, the protection switching mode and the dynamic re-routing mode are adapted to protecting the services. And there are the problems of matching, priority and mutual exclusion between the two modes. In the embodiments of the present invention, the protection switching lag time and the dynamic restoration lag time can be adapted to comparing the protection switching mode with the dynamic re-routing mode to determine their priorities. Then, a corresponding service protection mode is selected to be started. The two modes can be matched to avoid the mutual exclusion between them, enhance the reliability of the network and improve the self-healing capacity of the ASON.

It should be noted that T1 and T2 can be set according to the actual situation of users.

The protection switching process in S104 and the dynamic re-routing process in S106 are described respectively below in conjunction with FIG. 2 in detail.

Figure 2:
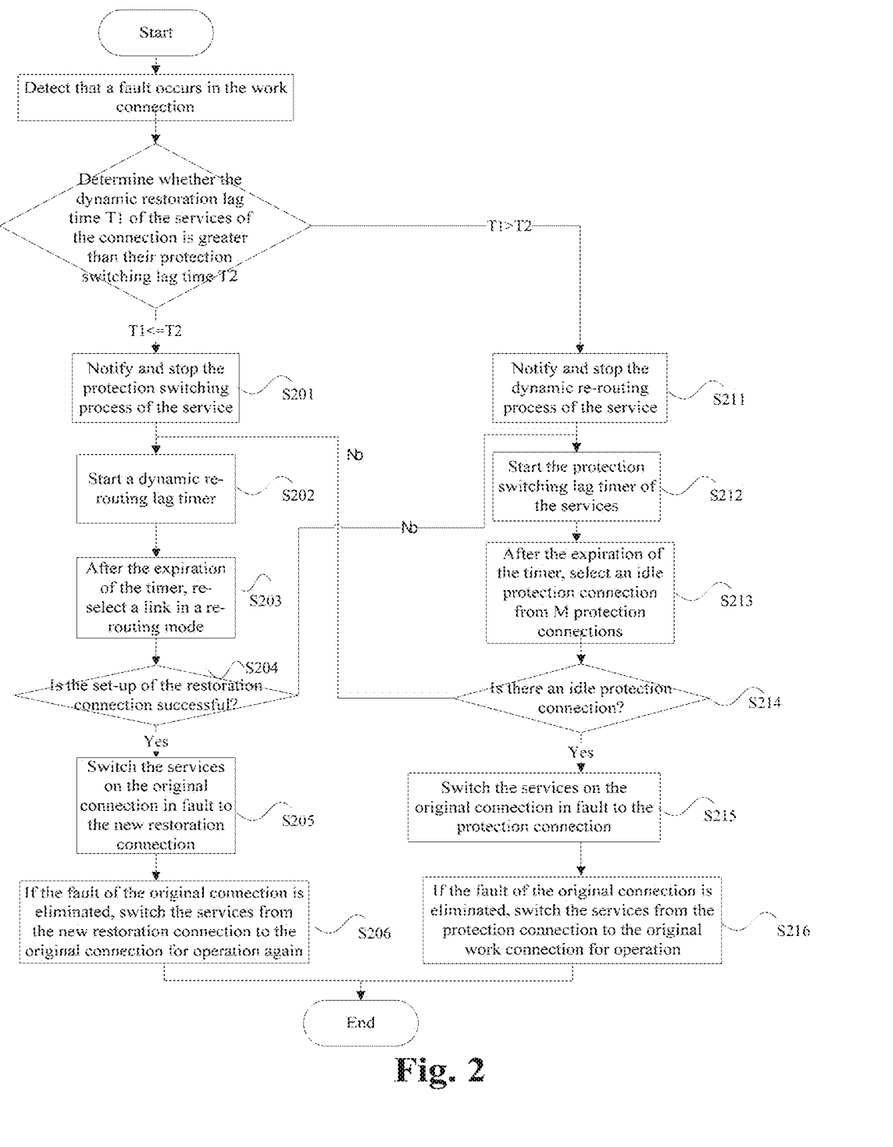
FIG. 2 is a specific flowchart of a service protection method according to the embodiments of the present invention.

FIG. 2 is a specific flowchart of a service protection method according to one embodiment of the present invention. As shown in FIG. 2, the dynamic re-routing process comprises S201 to S206.

S201: Firstly, notify and stop the protection switching process of the service.

S202: Before the re-selection of a route, start a dynamic re-routing lag timer, the time of which can be the dynamic restoration lag time T1. That is to say, start the dynamic re-routing lag timer of the services. But if the time of the timer is 0, do not start the timer.

S203: After the expiration of the timer, re-select a route, and set up a new connection for restoring the services. That is to say, re-select a link and set up a restoration connection in a re-routing mode.

S204: Determine whether the set-up of the connection is successful. If it is successful, execute S205; otherwise, start the protection switching process to restore the services.

S205: Switch the services to the connection. That is to say, switch the services on the original faulted connection to the new restoration connection. It should be noted that if a fault also occurs in the new restoration connection, repeat the above mentioned steps, i.e., set up a new connection by the dynamic re-routing process of the services again.

S206: If the fault of the original connection is eliminated, switch the services to the original connection. That is to say, if the fault of the original connection is eliminated, switch the services from the new restoration connection to the original connection for operation again.

As shown in FIG. 2, the protection switching process comprises S211 to S216.

S211: Notify and stop the dynamic re-routing process of the service.

S212: Start the protection switching lag timer, the time of which can be the protection switching lag time T2. That is to say, start the protection switching lag timer of the services, but if the time of the timer is 0, do not start it.

S213: After the expiration of the timer, select an idle protection connection from the protection connections. That is to say, select an idle protection connection from M protection connections.

S214: Determine whether there is an idle protection connection. If so, execute S215; otherwise, i.e. M protection connections are all occupied, start the dynamic re-routing process to restore the services.

S215: Select an idle protection connection from the protection connections and switch the services on the original connection to the idle protection connection. That is to say, switch the services on the original faulted connection to the protection connection. If the services fail to or cannot be switched to the idle protection connection, start the dynamic re-routing process to restore the services.

S216: If the fault of the original connection is eliminated, switch the services to the original connection. That is to say, if the fault of the original connection is eliminated, cancel the switch, and switch the services from the protection connection to the original work connection for operation.

The implementation process of the embodiment is described below in conjunction with examples in detail.

FIRST EXAMPLE

Figure 3:
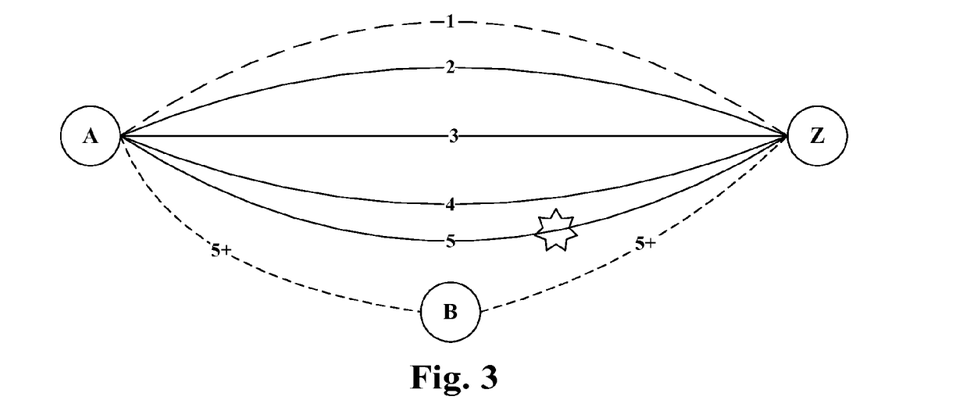
FIG. 3 is a diagram of a specific scene according to the first example of the present invention.

FIG. 3 is a diagram of a specific scene according to the first example of the present invention. As shown in FIG. 3, 5 services compose a protection group at a ratio of 1:4 (1 protection connection 1:4 work connections 2-5) with common start points and end points (A/Z). The dynamic re-routing restoration lag timer T1 and the protection switching lag time T2 of the services of the connection 5 are 100 ms and 300 ms respectively. When a fault occurs in the work connection 5, the processing flow comprises the following steps.

S301: Determine whether T1 is greater than T2; and as T1 (=100 ms) is less than T2 (=300 ms), start the dynamic re-routing restoration process.

S302: Start the dynamic re-routing restoration lag timer of the services of the work connection 5.

S303: After 100 ms, the timer is expired; then, re-select a route and set up a connection A-B-Z.

If the set-up of the connection A-B-Z is successful, execute S304; otherwise, execute S305.

S304: Switch the services on the original work connection 5 to the new restoration connection 5+ for operation without deleting the original work connection 5; and after the fault of the original work connection 5 is eliminated, switch the services on the new restoration connection 5+ to the original work connection 5 again for operation.

S305: Start the protection switching process, the specific flow of which is similar to the flow of S402 to S403 in the second example, thereby needing no further description.

SECOND EXAMPLE

Figure 4:
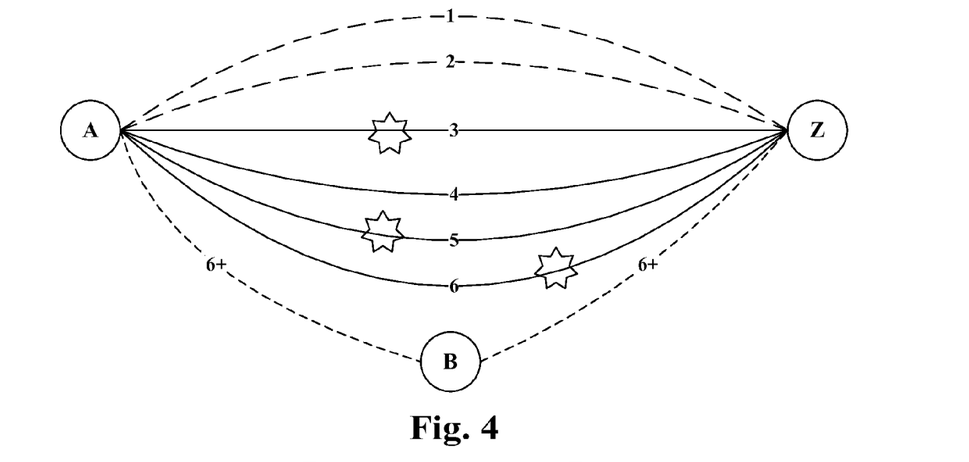
FIG. 4 is a diagram of a specific scene according to the second example of the present invention.

In FIG. 4, 6 services compose a protection group at a ratio of 2:4 (2 protection connections 1, 2: 4 work connections 3-6), with common start points and end points (A/Z). The dynamic re-routing restoration lag time T1 and the protection switching lag time T2 of the services of the connections (3-6) are 100 ms and 0 ms respectively. When a fault occurs in the work connection 3, the processing flow comprises the following steps.

S401: Determine whether T1 is greater than T2; and as T1 (=100 ms) is greater than T2 (=0 ms), start the protection switching process.

S402: As the protection switching lag time is 0 ms, do not start the protection switching lag timer but directly start to find an idle protection connection; if an idle protection connection (1) is found, execute S403, or otherwise, execute S404.

S403: Switch the services on the work connection 3 to the protection connection 1 for operation; and if the switch is successful, switch the services on the protection connection 1 to the original work connection 3 for operation after the fault on the work connection 3 is eliminated; and if the switch process is failed, execute S404.

S404: Start the dynamic re-routing restoration process as the services cannot be switched; the specific process is similar to the process of S302 to S304 in the first example, thereby needing no further description.

Then, when a fault occurs in the work connection 5, since there is still an idle protection connection 2, the processing flow is similar to that when a fault occurs in the connection 3, thereby needing no further description.

And, when a fault occurs in the work connection 6, i.e., all the work connections 3, 5, 6 have faults at the moment. At the moment, all the protection connections are occupied, so the switching cannot be performed, and the dynamic re-routing restoration process is started; the specific process is similar to the process of S302 to S304 in the first example. Finally, a new route A-B-Z is found, and the services are switched to a new connection 6+ for operation.

THIRD EXAMPLE

Figure 5:
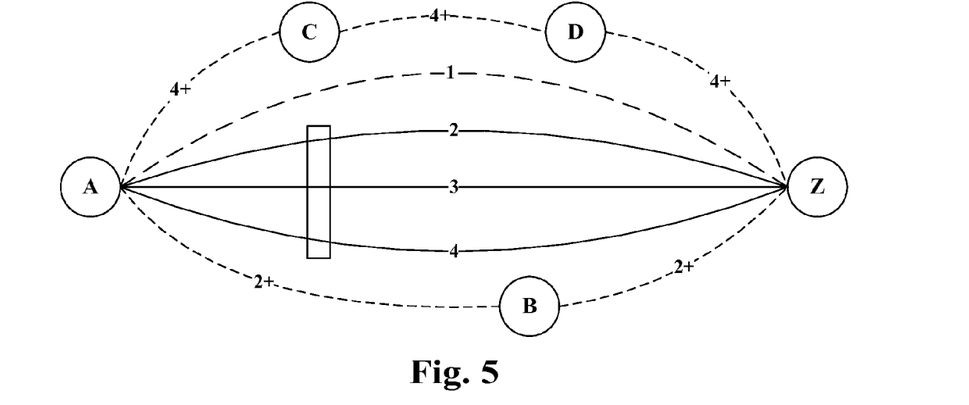
FIG. 5 is a diagram of a specific scene according to the third example of the present invention.

In FIG. 5, 4 services compose a protection group at a ratio of 1:3 (1 protection connection 1: 3 work connections 2-4), with common start points and end points (A/Z). The dynamic re-routing restoration lag time T1 of the services of the work connections 2-4 are 100 ms, 200 ms and 300 ms respectively; and their protection switching lag time T2 are all 150 ms. When a fault occurs in the work connections 2-4 synchronously, the processing flow comprises the following steps.

S501: As T1 (=100 ms) of the work connection 2 is less than T2 (=150 ms), start the dynamic re-routing restoration process and find a new route A-B-Z to switch the services to a restoration connection for operation; the specific process is similar to the process of S302 to S304 in the first example, thereby needing no further description.

S502: As T1 (=200 ms) of the work connection 2 is greater than T2 (=150 ms), start the protection switching process and find an idle protection connection 1 to switch the services to a restoration connection for operation; the specific process is similar to the process of S402 to S403 in the second example, thereby needing no further description.

S503: As T1 (=300 ms) of the work connection 3 is greater than T2 (=150 ms), but all the protection connections have been occupied at the moment and the switch cannot performed as there is no idle protection connection, start the dynamic re-routing restoration process and find a new route A-C-D-Z to switch the services to a restoration connection for operation; the specific process is similar to the process of S302 to S304 in the first example, thereby needing no further description.

By the embodiments, the present invention provides a service protection method of combining the protection switching mode of a protection group with the dynamic re-routing restoration mode of the services flexibly and effectively by a control plane in an ASON, so as to enhance the reliability of the network and improve the self-healing capacity of the network.

Figure 6:
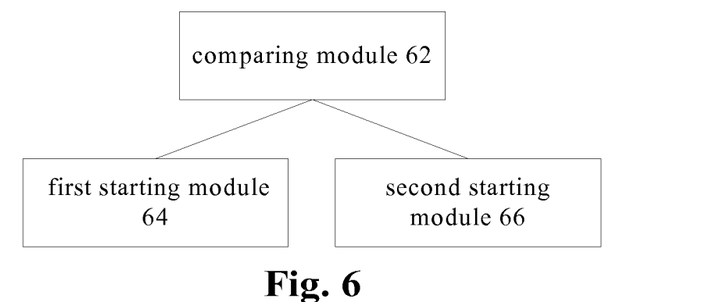
FIG. 6 is a diagram showing the structure of a service protection device according to the embodiments of the present invention.

According to the embodiments of the present invention, a service protection device based on an ASON is provided, which is adapted to restoring services when a fault occurs in the connection of the services. FIG. 6 is a diagram showing the structure of a service protection device according to one embodiment of the present invention, as shown in FIG. 6, the device comprises: a comparing module 62, a first starting module 64, and a second starting module 66, which are described below in details.

The comparing module 62 is adapted to compare the dynamic restoration lag time of the services with their protection switching lag time; the first starting module 64 is connected to the comparing module 62 and adapted to start the protection switching process to restore the services if the dynamic restoration lag time is greater than the protection switching lag time; and the second starting module 66 is connected to the comparing module 62 and is adapted to start the dynamic re-routing process to restore the services if the protection switching lag time is greater than the dynamic restoration lag time. It should be noted that if the two times are the same, either the protection switching process or the dynamic re-routing process can be selected to restore the services as needed.

That is, when a fault occurs in a work connection is detected, the comparing module 62 determines whether the dynamic restoration lag time T1 of the services of the connection is greater than their protection switching lag time T2; if so, the first starting module 64 starts the protection switching process to restore the services, otherwise, the second starting module 66 starts the dynamic re-routing process to restore the services. T1 and T2 can be set according to the actual situation of users.

It should be noted that the dynamic re-routing process is stopped before the first starting module 64 starts the protection switching process to restore the services; and the protection switching process is stopped before the second starting module 66 starts the dynamic re-routing process to restore the services.

To sum up, by the embodiments of the present invention, a user can determine the protection policy by setting the dynamic restoration lag time and the protection switching lag time during the configuration of the protection group, i.e., which mode is given preference to protect the services when a fault occurs in the connection. It solves the matching and priority problems of the protection switching mode and the dynamic re-routing restoration mode. Meanwhile, the mode to be adopted may have been determined before the protection; and only one mode is adopted once to protect the services, so as to reduce the consumption of the system and also solve the mutual exclusion problem of the two modes.

Obviously, those skilled in the art should understand that the models or steps of the present invention may be implemented by general computing devices and centralized in a single computing device or distributed in a network consisting of multiple computing devices. Optionally, the models or steps may be implemented by program codes executable by the computing devices, so that they may be stored in a storage device and executed by the computing device, or respectively made into integrated circuit modules or a single integrated circuit module. By doing so, the present invention is not limited to any specific combination of hardware and software.

The above are only preferred embodiments of the present invention and should not be used to limit the present invention. For those skilled in the art, the present invention may have various modifications and changes. Any modifications, equivalent replacements, improvements and the like within the spirit and principle of the present invention shall fall within the scope of protection of the present invention.

What is claimed is:

1. A service protection method based on an automatic switched optical network (ASON), used for restoring a service when a fault occurs in the connection of the service, comprising:
   comparing a dynamic restoration lag time of the service with a protection switching lag time of the service; and
   starting a protection switching process to restore the service if the dynamic restoration lag time is greater than the protection switching lag time; and starting a dynamic re-routing process to restore the service if the protection switching lag time is greater than the dynamic restoration lag time,
   wherein the step of starting the dynamic re-routing process to restore the service comprises:
   re-selecting a route and setting up a new connection for restoring the service;
   switching the service to the connection if the set-up of the new connection is successful; and
   starting the protection switching process to restore the service if the set-up of the new connection is failed.

2. The method according to claim 1, wherein after the service is switched to the new connection, the method further comprises:
   switching the service to the connection, if the fault of the connection is eliminated.

3. The method according to claim 2, wherein the step of starting the dynamic re-routing process to restore the service further comprises:
   starting a dynamic re-routing lag timer before the re-selection of the router, and re-selecting the route after the expiration of the dynamic re-routing lag timer.

4. The method according to claim 1, wherein the step of starting the dynamic re-routing process to restore the service further comprises:
   starting a dynamic re-routing lag timer before the re-selection of the router, and re-selecting the route after the expiration of the dynamic re-routing lag timer.

5. The method according to claim 1, wherein the step of starting the protection switching process to restore the service comprises:
   selecting an idle protection connection from protection connections and switching the service on the connection to the idle protection connection.

6. The method according to claim 5, wherein the method further comprises:
   starting the dynamic re-routing process to restore the service if switching the service to the idle protection connection is failed or all the protection connections are occupied.

7. The method according to claim 5, wherein the step of starting the protection switching process to restore the service further comprises:
   starting a protection switching lag timer before an idle protection connection is selected from the protection connections, and selecting an idle protection connection from the protection connections after the expiration of the protection switching lag timer.

8. The method according to claim 6, after the service on the connection is switched to the idle protection connection, the method further comprises:
   switching the services to the connection if the fault of the connection is eliminated.

9. The method according to claim 6, wherein the step of starting the protection switching process to restore the service further comprises:
   starting a protection switching lag timer before an idle protection connection is selected from the protection connections, and selecting an idle protection connection from the protection connections after the expiration of the protection switching lag timer.

10. The method according to claim 6, wherein the method further comprises:
   stopping the protection switching process before the dynamic re-routing process is started to restore the service; or
   stopping the dynamic re-routing process before the protection switching process is started to restore the service.

11. The method according to claim 8, wherein the step of starting the protection switching process to restore the service further comprises:
   starting a protection switching lag timer before an idle protection connection is selected from the protection connections, and selecting an idle protection connection from the protection connections after the expiration of the protection switching lag timer.

12. The method according to claim 1, wherein the method further comprises:
   stopping the protection switching process before the dynamic re-routing process is started to restore the service; or
   stopping the dynamic re-routing process before the protection switching process is started to restore the service.

13. The method according to claim 1, wherein the method further comprises:
   stopping the protection switching process before the dynamic re-routing process is started to restore the service; or
   stopping the dynamic re-routing process before the protection switching process is started to restore the service.

14. A service protection device based on an ASON, used for restoring a service when a fault occurs in the connection of the service, comprising:
   a comparing module adapted to compare whether a dynamic restoration lag time of the service is greater than a protection switching lag time of the service;
   a first starting module adapted to start the protection switching process to restore the service if the dynamic restoration lag time is greater than the protection switching lag time; and
   a second starting module adapted to start the dynamic re-routing process to restore the service if the protection switching lag time is greater than the dynamic restoration lag time,
   wherein the operation of starting the dynamic re-routing to restore the service comprises:
   re-selecting a route and setting up a new connection for restoring the service;
   switching the service to the new connection if the set-up of the new connection is successful; and
   starting the protection switching process to restore the service if the set-up of the new connection is failed.

* * * * *

UNITED STATES PATENT AND TRADEMARK OFFICE
CERTIFICATE OF CORRECTION

| | | |
|---|---|---|
| PATENT NO. | : 8,805,180 B2 | Page 1 of 1 |
| APPLICATION NO. | : 13/378897 | |
| DATED | : August 12, 2014 | |
| INVENTOR(S) | : Chen | |

It is certified that error appears in the above-identified patent and that said Letters Patent is hereby corrected as shown below:

In the CLAIMS:

Claim 1, Column 8, line 27 delete: "...switching the service to the connection..."
and insert: --...switching the service to the new connection...--

Signed and Sealed this
Fourteenth Day of October, 2014

Michelle K. Lee
*Deputy Director of the United States Patent and Trademark Office*